United States Patent [19]

Leitch

[11] Patent Number: 5,068,874
[45] Date of Patent: Nov. 26, 1991

[54] SPECTRALLY EFFICIENT DIGITAL FM MODULATION SYSTEM

[75] Inventor: Clifford D. Leitch, Coral Springs, Fla.

[73] Assignee: Motorola, Inc., Schaumburg, Ill.

[21] Appl. No.: 390,317

[22] Filed: Aug. 7, 1989

[51] Int. Cl.$^5$ ............................................. H03C 1/06
[52] U.S. Cl. ........................................ 375/51; 375/58; 375/101; 375/60; 332/123; 332/159
[58] Field of Search ................... 375/18, 34, 45, 51, 375/58, 60, 101; 455/43; 332/123, 124, 159, 107, 160

[56] References Cited

U.S. PATENT DOCUMENTS

| | | | |
|---|---|---|---|
| 4,123,755 | 10/1978 | Fishbein et al. | 375/60 |
| 4,135,057 | 1/1979 | Bayless, Sr. et al. | 375/58 |
| 4,412,337 | 10/1983 | Bickley et al. | 375/60 |
| 4,435,751 | 3/1984 | Hori et al. | 375/58 |
| 4,507,794 | 3/1985 | Jones et al. | 375/58 |
| 4,694,468 | 9/1987 | Cullum | 375/101 |
| 4,737,969 | 4/1988 | Steel et al. | 375/39 |

OTHER PUBLICATIONS

IEEE Communications, vol. 24, No. 4, Carl-Erik Sundberg "Continuous Phase Modulation", published Apr. 1986, pp. 25-38.

Primary Examiner—Benedict V. Safourek
Assistant Examiner—Young Tse
Attorney, Agent, or Firm—Philip P. Macnak; Vincent B. Ingrassia; William E. Koch

[57] ABSTRACT

A method is described for transmitting digital data with minimum splatter and for recovering the same with a conventional frequency modulated (FM) receiver to obtain data having minimum intersymbol interference. The method utilizes an optimized prototype pulse which has been predistorted to match the inverse characteristics of the post detection low pass filter in a conventional FM receiver. When the optimized electric pulse is received and processed by the post detection low pass filter of the conventional FM receiver, a pulse shape exhibiting minimal intersymbol interference is produced.

8 Claims, 7 Drawing Sheets $P_0(t) = (\sin \pi t)/\pi t$ $P_1(f)$

FR(f)

P₂(f)

P₂(t)

SPECTRALLY EFFICIENT DIGITAL FM MODULATION SYSTEM

BACKGROUND OF THE INVENTION

1. Field of the Invention

This invention relates generally to the field of communications systems, and more particularly to a communication system providing a spectrally efficient digital FM modulation system for use with a conventional frequency modulated (FM) receiver.

2. Description of the Prior Art

A number of problems exist with digital frequency modulated (FM) transmission systems. One such problem relates to splatter and adjacent channel interference created when rectangular pulses, such as found in strings of digital information, is transmitted. It is well known that this splatter is reduced by low pass filtering the baseband modulating signal. Many waveshaping functions are known which minimize the spectrum occupied by the baseband modulating signal. Unfortunately, in an FM system, minimal occupied baseband spectrum does not imply minimal occupied radio frequency (RF) spectrum. Many of the well known waveshaping functions produce high modulation overshoots which result in excessive splatter, even though the baseband frequency spectrum is well contained. A means of reliably minimizing the splatter of the transmitted RF signal, considering both baseband spectrum and modulation overshoots is required.

A second problem occurring in digital FM modulated transmission systems is the generation of intersymbol interference in the received signal. In general, this is caused by the waveshaping which is required to reduce splatter. When waveshaping is employed, each transmitted bit becomes spread out in time over several adjacent bits resulting in interference during the detection of these bits. Intersymbol interference results in a sensitivity loss in the receiver. Only certain classes of shaped signals are known to exhibit no intersymbol interference. However, most of these shaped signals are extremely complex in structure. A means of adapting one or more of these shaped signals is required if intersymbol interference is to be minimized.

When such complex shaped signals are used, very complicated analog filters are required in the receiver to obtain the low intersymbol interference inherent in the signal. A means is required to adapt these complex shaped signals for use in receivers using conventional post detection filtering commonly found in the FM receivers, such as pagers, which are in wide use today.

Many FM modulation systems also place constraints on the bit rate at which digital data can be transmitted. Any method which reduces splatter while minimizing intersymbol interference should not unduly restrict the maximum bit rate which can be transmitted in a given RF channel.

SUMMARY OF THE INVENTION

It is an object of the present invention to provide a communication system providing spectrally efficient data transmission over a broad range of data transmission rates.

It is a further object of the present invention to provide a communication system which minimizes adjacent channel splatter over the broad range of data transmission rates.

It is a further object of the present invention to provide a communication which minimizes received intersymbol interference over the broad range of data transmission rates.

It is a further object of the present invention to provide a communication system which utilizes a conventional frequency modulated (FM) receiver for the reception of the broad range of data transmission rates.

A method is described for transmitting digital data with minimum splatter and for recovering the same with a conventional frequency modulated (FM) receiver to obtain data having minimum intersymbol interference. The method utilizes a optimized prototype pulse which has been pre-distorted to match the inverse characteristics of the post detection low pass filter in a conventional FM receiver.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
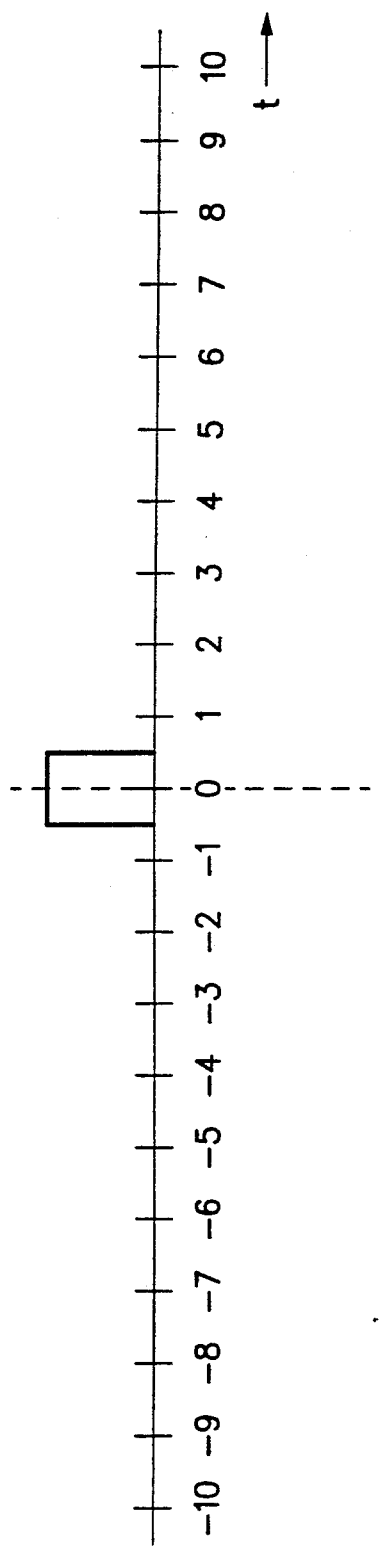
FIG. 1 is a representation of a rectangular digital prototype pulse or signaling waveform which results in consumption of relatively large amounts of frequency spectrum when modulated on a radio frequency carrier signal.

To facilitate an understanding of the present invention, a discussion of the method of generating a digital pulse which is optimized both in terms of the time domain (bit rate, pulse duration) and frequency domain (frequency consumed) ensues. For purposes of this example, it is assumed that digital pulses normalized to 1 bit/sec such as the pulse illustrated in FIG. 1, are desired to be transmitted. If a series of such nearly square wave or rectangular pulses were modulated on an electromagnetic carrier wave, the sharp transitions in such pulses would result in the consumption of an unduly large amount of frequency spectrum. This is not acceptable given the bandwidth constraints which are imposed by modern communication systems.

It is desirable to produce a prototype pulse which, when transmitted, minimizes the splatter and adjacent channel interference. The prototype pulse should be compatible with data transmissions over a broad range of data bit rates, such as the 600 bit per second data rate of the POCSAG signaling format, to data bit rates of 4800 and 9600 bits per second, and higher. The prototype pulse should be readily detected using conventional FM receivers with simple post detection filtering. The derivation of one embodiment of the prototype pulse of the present invention is shown in FIGS. 2A–2C and 3A–3B.

Figure 2A:
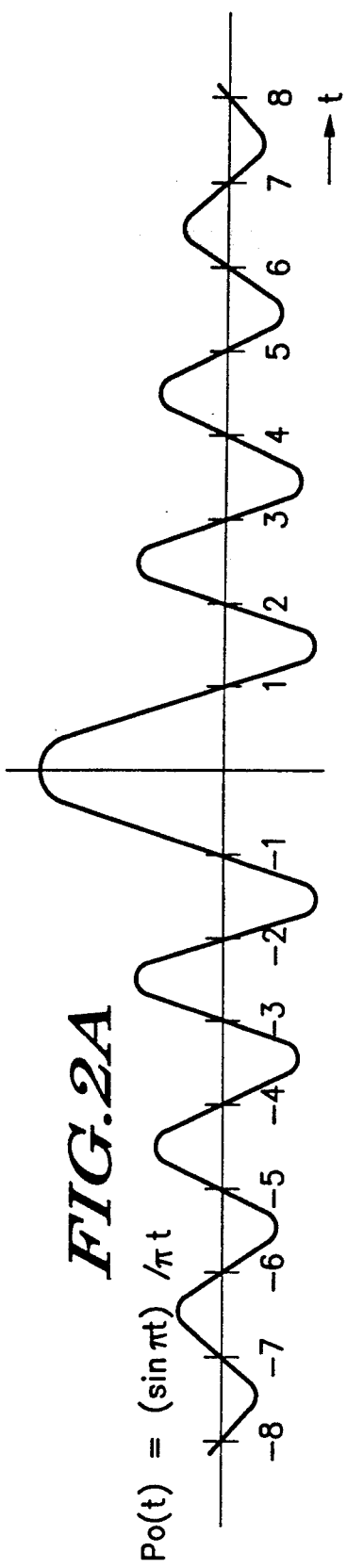
FIG. 2A is a graphic representation of a reference pulse exhibiting minimum intersymbol interference.

FIG. 2A is a graphic representation of the reference pulse $P_0(t)$ used as the starting point. The reference pulse used is the well known function $(\sin \pi t)/\pi t$ which exhibits the desirable characteristic of providing no intersymbol interference. The reference pulse represented by this function is too complex to use directly and would also result in the generation of considerable splatter and adjacent channel interference.

Figure 2B:
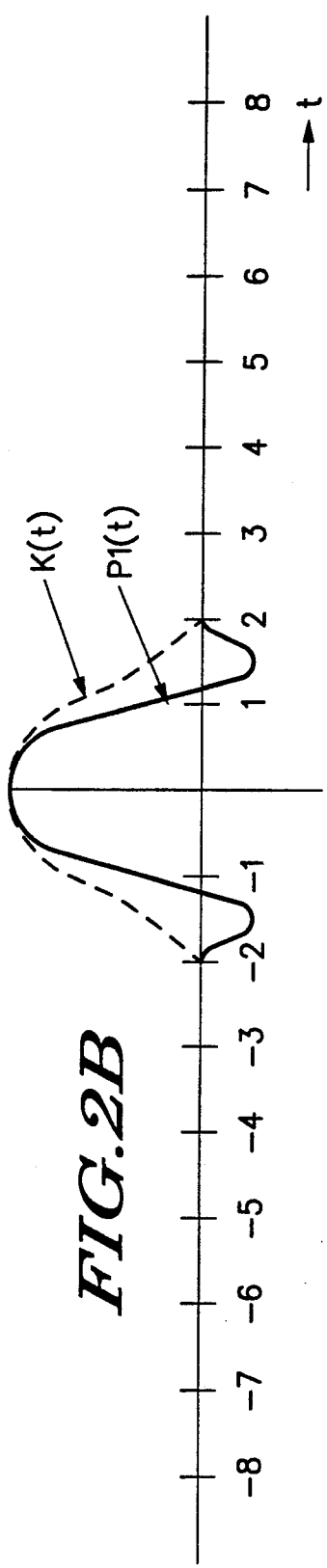
FIG. 2B is a representation of a window function applied to the reference pulse to minimize energy outside the window.

As shown in FIG. 2B, a window function $K(t)$ is applied to the reference pulse $P_0(t)$ truncating the pulse to a length of from $\pm 1$ second to $\pm 3.5$ seconds. The optimum value selected depends on the frequency deviation used in the system. Too short a window increases the spectrum occupied by the baseband signal, resulting in excess splatter in the transmitted signal. Too long a window results in high modulation overshoots, also resulting in excess splatter in the transmitted signal. The preferred window function $K(t)$ is a Kaiser window which truncates the reference pulse $P_0(t)$ to a length of $\pm 2$ seconds. A description of the Kaiser window function may be found in a textbook by Childers and Durling entitled "Digital Filtering and Signal Processing", published 1975 by West Publishing Company of St. Paul, Minn., on pages 437 to 440 the inclusion of which is incorporated by reference herein. The resultant window reference pulse $P_1(t)$ is obtained by multiplying the reference pulse $P_0(t)$ by the window function $K(t)$.

Figure 2C:
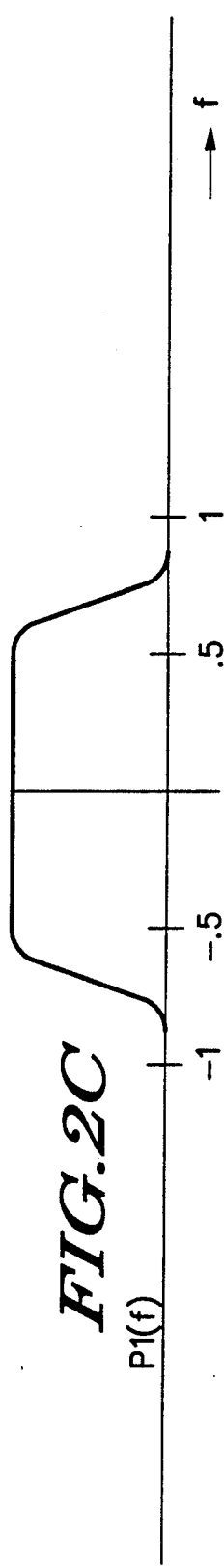
FIG. 2C is a representation of the spectrum derived by taking the Fourier transform of the windowed reference pulse.

Once the windowed reference pulse has been determined, as described, the spectrum $P_1(f)$ is determined by taking the Fourier transform of the windowed reference pulse $P_1(t)$. A graphic representation of the spectrum $P_1(f)$ derived is shown in FIG. 2C.

Figure 3A:
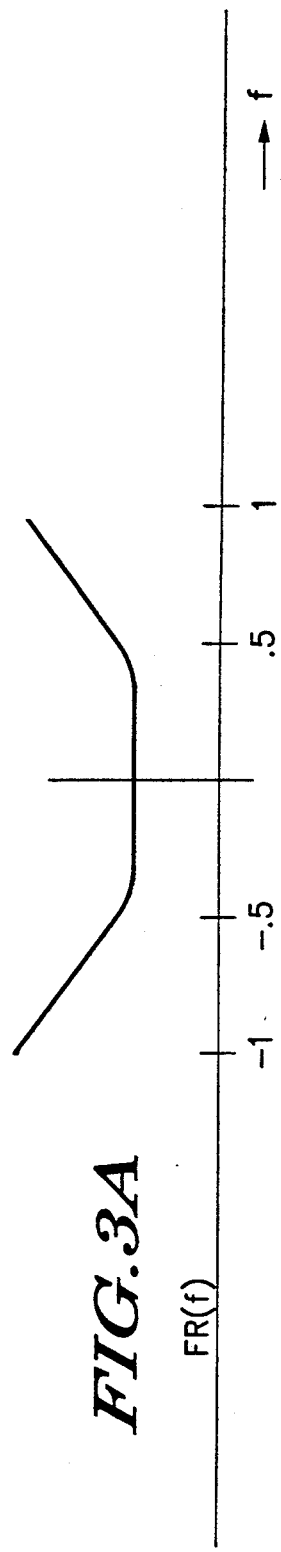
FIG. 3A is a representation of the spectrum of the reciprocal of the transfer function of a receiver post detection filter.
Figure 3B:
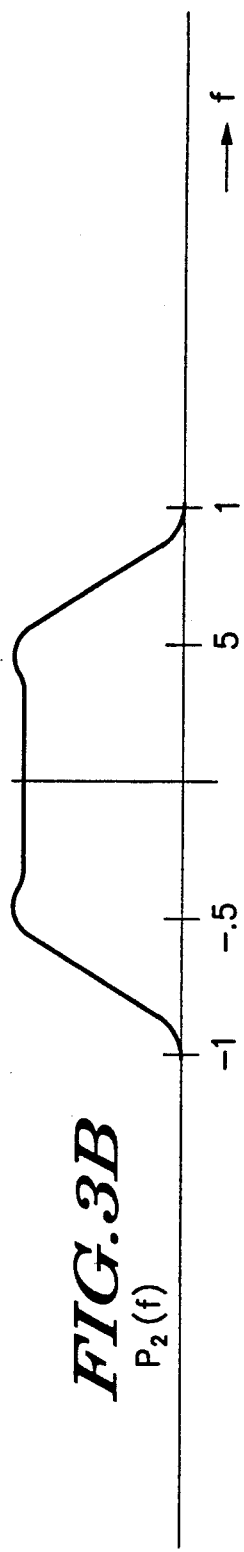
FIG. 3B is a representation of the spectrum derived by applying transformed pulse of FIG. 2C to the response derived in FIG. 3A.
Figure 3C:
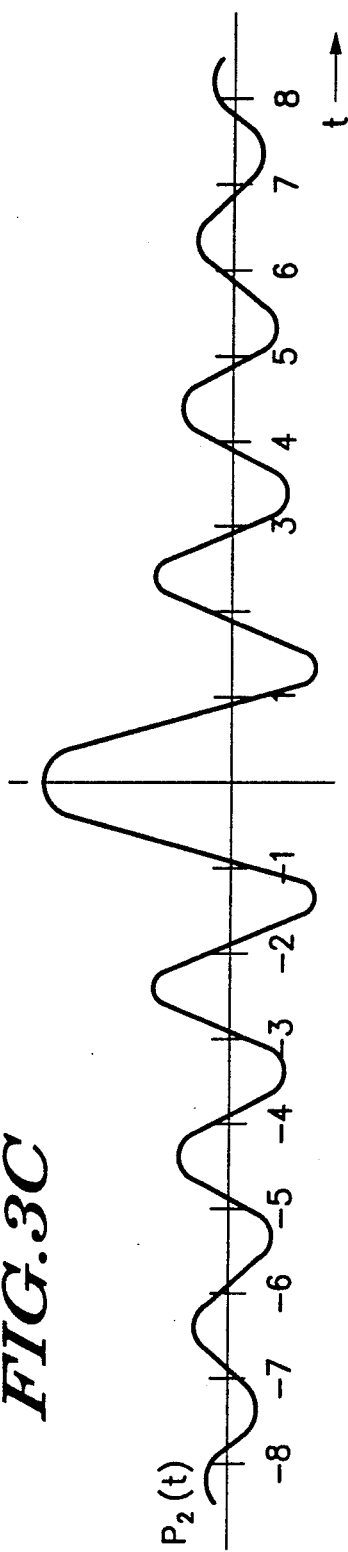
FIG. 3C is a representation of a pre-distorted pulse matching the characteristics of the receiver post detection filter, derived by taking the inverse Fourier transform of the waveform of FIG. 3B.

The next step in determining the final prototype pulse is to determine the filter function $FR(f)$ which is the reciprocal of the transfer function of the post detection low pass filter utilized in the receiver of the preferred embodiment of the present invention. That is, $FR(f) = 1/H(f)$ for all values of f, where $H(f)$ is the transfer function of the receiver post detection filter. For optimum detection characteristics in the receiver, the post detection low pass filter used in the receiver is preferably a second order Butterworth filter with a 0.6 Hz cutoff frequency. A graphic representation of the spectrum of the reciprocal filter function $FR(f)$ is shown in FIG. 3A. From the reciprocal filter function $FR(f)$, the spectrum $P_2(f)$ of the desired prototype pulse $P_2(t)$ can be determined by multiplying the spectrum of the filter function $FR(f)$ by the spectrum $P_1(f)$ of the windowed reference pulse. A graphic representation of the spectrum $P_2(f)$ of the desired prototype pulse is shown in FIG. 3B. The desired prototype pulse $P_2(t)$ is next determined by taking the inverse Fourier transform of the spectrum $P_2(f)$ of the desired prototype pulse $P_2(t)$ obtained in FIG. 3B. A graphic representation of the desired prototype pulse $P_2(t)$ is shown in FIG. 3C. It should be noted that the desired prototype pulse $P_2(t)$ has been distorted from an ideal $(\sin \pi t)/\pi t$ function by the process described, resulting in zero crossings to occur at intervals along the time axis which are other then at integer increments, as with the $(\sin \pi t)/\pi t$ function. Since the distortion imposed was using the reciprocal of the transfer function of the post detection low pass filter, a similar but opposite distortion effect will occur in the receiver, restoring the zero crossings to integer increments in the receiver.

Figure 4:
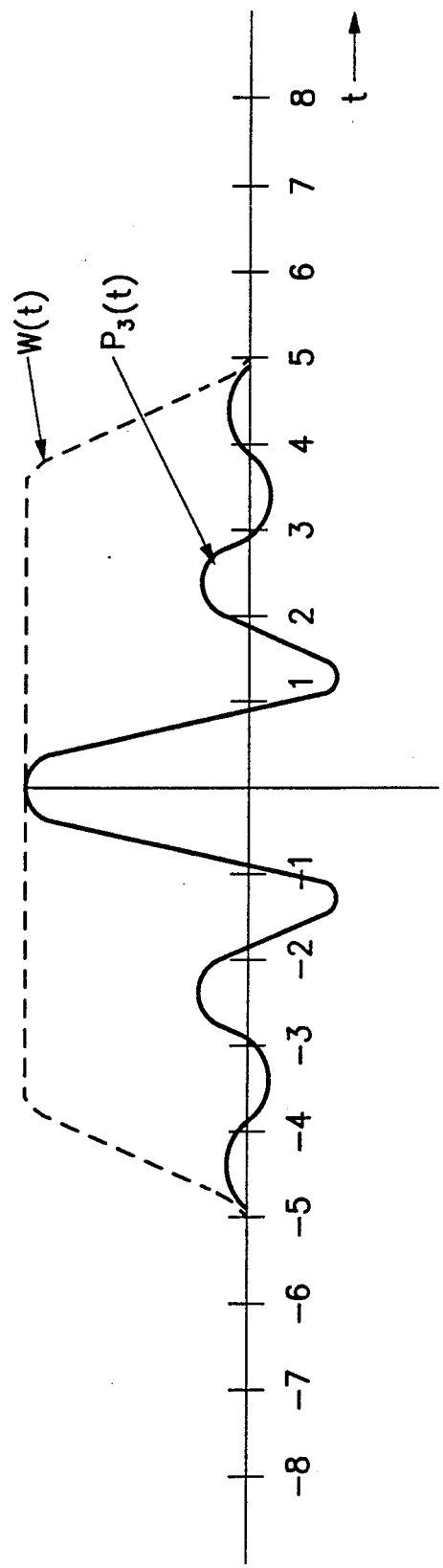
FIG. 4 is a presentation of the final prototype pulse of the present invention derived by windowing the pre-distorted pulse of FIG. 3C.

The desired prototype pulse $P_2(t)$ as shown in FIG. 3C is too complex for utilization. The final step in deriving a final prototype pulse providing the original goals of low splatter and adjacent channel interference, and minimum intersymbol distortion is shown by the graphic representation illustrated in FIG. 4. The final prototype pulse $P_3(t)$ is determined by applying a second predetermined window function $W(t)$ to truncate the time span of the desired prototype pulse $P_2(t)$ to a finite length while preserving virtually all of the energy of the pulse. The preferred method is to apply a window equal to unity in the region from $\pm 4$ seconds, having cosine squared shaping, which is well known to one of ordinary skill in the art, in the regions $-5$ to $-4$ and $+4$ to $+5$ seconds, and thereafter being zero outside of $\pm 5$ seconds. A graphic representation of the final prototype pulse $P_3(t)$ is shown in FIG. 4, and was obtained by multiplying the desired prototype pulse $P_2(t)$ by the second window function $W(t)$.

To summarize, a method of mathematically deriving a final prototype pulse $P_3(t)$ has been illustrated in FIGS. 2A–2C, 3A–3C, and 4. The final prototype pulse $P_3(t)$ has the characteristics of providing low splatter and adjacent channel interference during transmission, and minimum intersymbol distortion when being detected in the receiver. As previously described, the derivation obtained was for a pulse normalized for 1 symbol/second. It will be appreciated that the result obtained may be scaled for a wide range of data bit rates. When scaling the final prototype pulse to other data bit rates, it will be appreciated that the time indicated scales down and frequency scales up as the data bit rate is increased.

Figure 5:
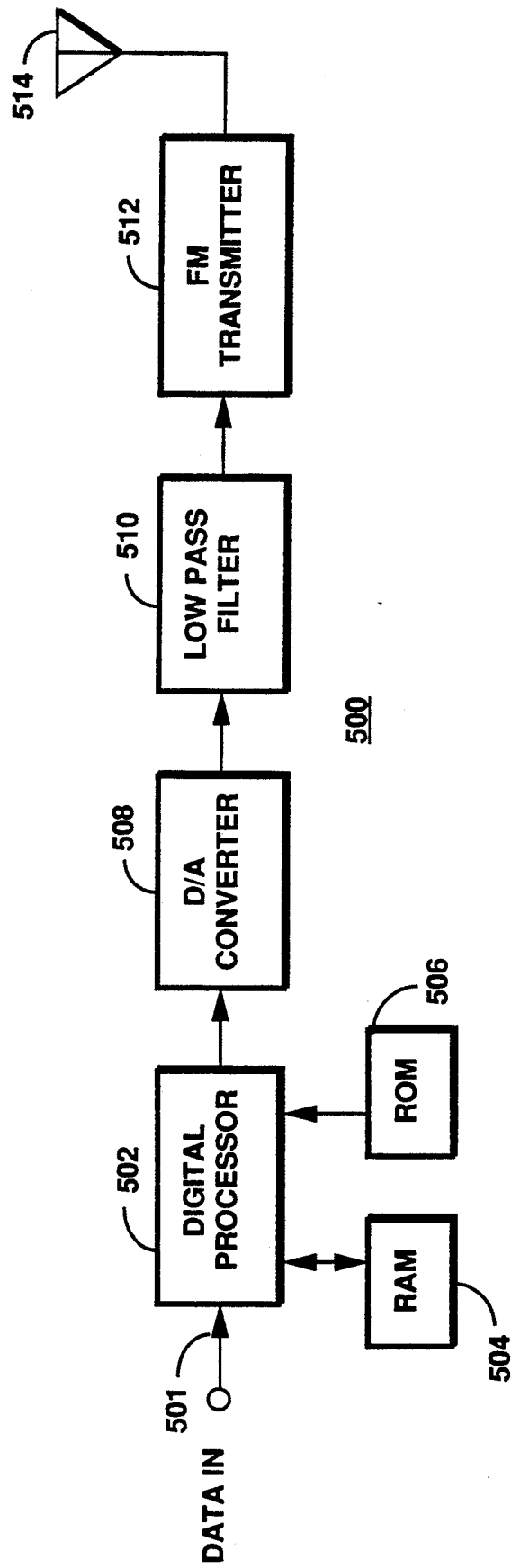
FIG. 5 is an electrical block diagram of the transmitting apparatus of the present invention.

FIG. 5 is an electrical block diagram of the transmitting apparatus 500 of the present invention. The heart of the transmitting apparatus 500 is a digital processor 502, such as a DSP 56000 digital signal processor integrated circuit manufactured by Motorola, Inc. Coupled to the digital processor 502, is a random access memory (RAM) 504 and a read only memory (ROM) 506. RAM 504 provides temporary storage for digital processor 502. Numerical values of the final prototype pulse $P_3(t)$, previously described, are stored in ROM 506. The final prototype pulse $P_3(t)$ is sampled from ROM 506 at a rate consistent with the rate at which data is input at digital processor input 501. The data input is a stream of binary information corresponding the the receiver addresses and messages desired to be transmitted. For each transmitted symbol, the sampled values of the prototype pulse, in sequence, are multiplied by a constant which depends on the data to be transmitted and each in turn is added to the output stream. The constants are, for example, +1 to send a logic one, and −1 to send a logic zero. This would result in transmitting the prototype pulse to represent a logic one, and the negative of the prototype pulse to represent a logic zero. The method is easily extended to multilevel transmission. For example, constants of −1, −.333, +.333, and +1 could be used for four-level transmission.

The stream of prototype pulse data is converted to analog form by digital to analog (D/A) converter 508, such as an MC145040 D/A converter manufactured by Motorola, Inc. The output of D/A converter 508 is then filtered by low pass filter 510 to eliminate the spurious signals which arise in the digital to analog conversion process. The design of low pass filters to eliminate the spurious signals arising in the digital to analog conversion process are well known in the art. The resulting baseband modulating signal at the output of the low pass filter 510 is used as the modulating signal for a conventional FM transmitter 512 which couples to antenna 514 for transmission of the modulated signal.

Figure 6:
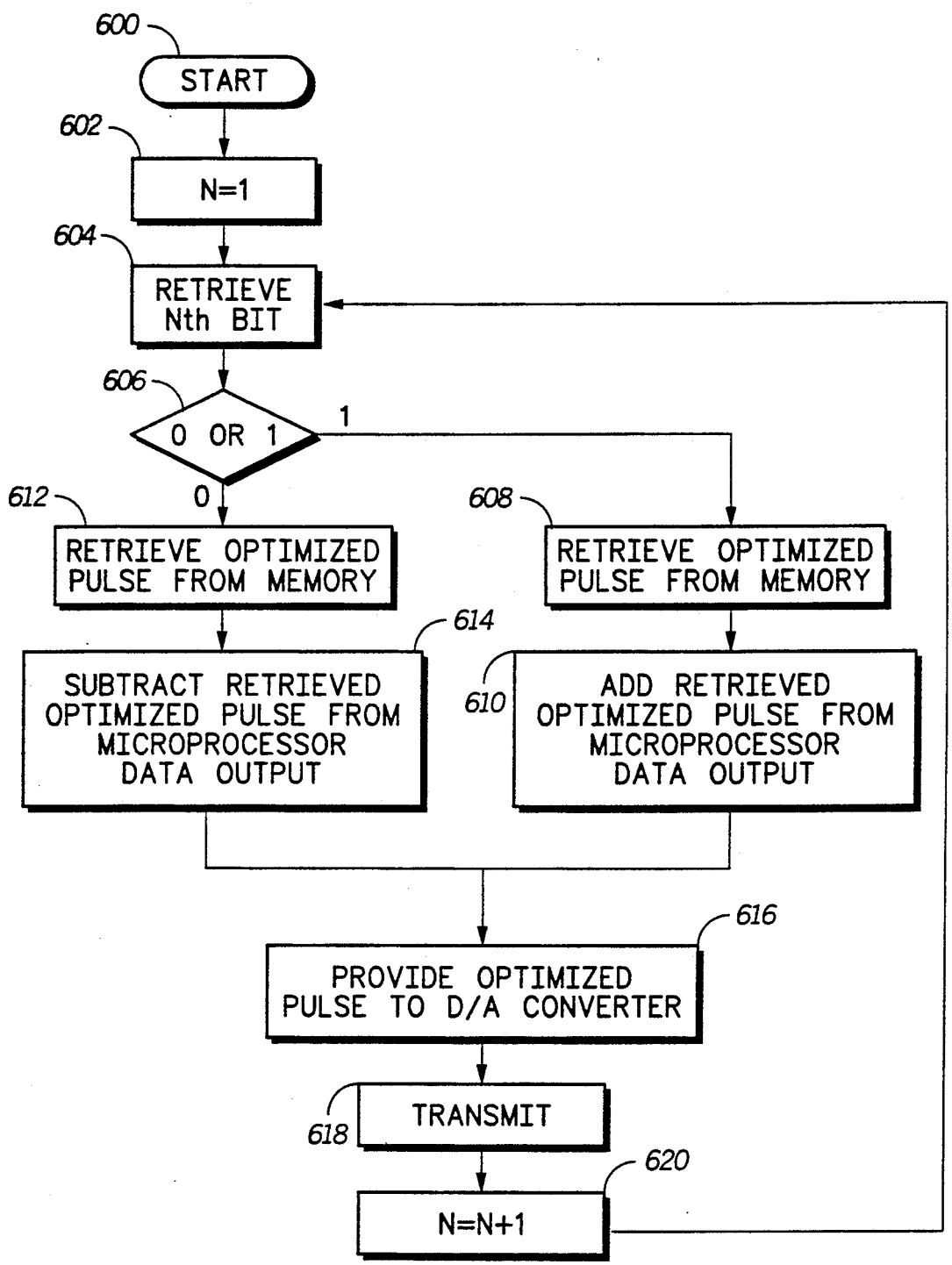
FIG. 6 is a flow chart of the software program which is stored in memory in the transmitting apparatus of FIG. 5 to govern the operation of such transmitting apparatus.

FIG. 6 is a flowchart of the software program which is employed to govern the operation of digital processor 502 in accordance with the present invention. Such software program is stored in ROM 506. As seen in FIG. 6, the operational routine begins at block 600 at which the system is initialized. N is defined to be an index number which corresponds to each of the bits of data which are to be transmitted by transmitter 512. For example, for the first bit of data at data input 501 which is to be transmitted, N is defined to be equal to one. For the second bit of such data, N equals 2 and so forth. Flow continues to block 602 at which N, the number of the data input bit, is set to equal 1. At block 604, digital processor 502 reads the first bit (N=1) of data from data input 501. Digital processor 502 then determines whether such first bit is a logical 0 or 1 at decision block 606. If the first bit (N=1) is determined to be a logical 1, then digital processor 502 retrieves the samples of the optimized pulse stored in ROM 506, at block 608, and adds such samples, at block 610, to the output of digital processor 502. If, however, the first bit (N=1) is determined to be a logical 0, the digital processor 502 retrieves the samples of the optimized pulse stored in ROM 506, at block 612, and subtracts such samples from the output of digital processor 502, at block 614. In either case, the samples of the optimized pulse (whether the positive or the negative thereof) are then provided the D/A converter 508 at block 616 at which such samples are converted into an analog reproduction of the optimized pulse. The reconstructed optimized pulse is then transmitted by transmitter 512, as per block 618, after being suitably filtered by low pass filter 510. Digital processor 502, at block 620, then advances the N counter to the next bit of input data (N=2) such that the digital processor 502 reads the second bit at block 604 and processes such second bit as described above. Process flow continues in a substantially similar manner for the subsequent bits N=3,4....

Figure 7:
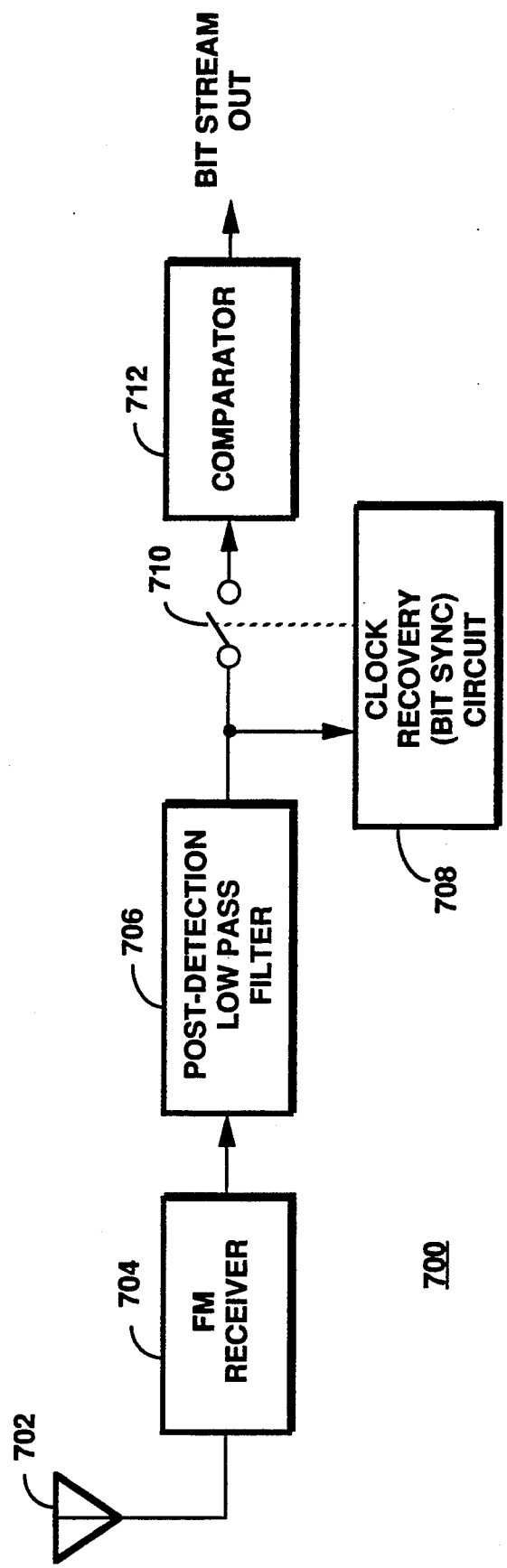
FIG. 7 is an electrical block diagram of a conventional FM receiver employed to receive transmissions from the transmitting apparatus of FIG. 5.

FIG. 7 is an electrical block diagram of the conventional receiver employed to receive the transmissions from the transmitting apparatus of FIG. 5. The transmitted stream of optimized prototype pulse signals is intercepted by antenna 702 and received by FM receiver 704. FM receiver 704 is a conventional FM receiver which is well known in the art and utilizes any of a number of well known demodulator circuits, such as pulse count discriminators and peak and valley detectors, for the detection of the received FM signals. The output from FM receiver 704 is a waveform stream characteristic of the transmitted optimized prototype pulse signals generated to represent the binary information pattern desired to be transmitted. As previously described, these optimized prototype pulse signals have been pre-distorted from an ideal (sin $\pi t$)/$\pi t$ function waveform, by the processing that occurred at the transmitting apparatus 500. The output of FM receiver 704 is coupled to post detection low pass filter 706 which is preferably a second order Butterworth filter with a 0.6 Hz cutoff frequency for data normalized to 1 symbol/second. Post detection low pass filter 706 filters out the excess discriminator noise, and distorts the recovered waveform so that zero crossings of each transmitted pulse occur at integer intervals of time, restoring the characteristic of having no intersymbol interference in the recovered signals. The output of post detection low pass filter 706 is coupled to a clock recovery circuit 708 which is used to obtain bit synchronization from the recovered data signal in a manner well known to one of ordinary skill in the art. The clock recovery circuit 708 controls sampling the output of the post detection low pass filter 706. The sampling function is indicated by switch 710. Bit decisions are based on the amplitude of each sampled bit. When the recovered signal is positive, indicating the transmission of the optimized prototype pulse signal, a logical one is generated at the output of comparator 712. When the recovered signal is negative, indicating the transmission of the inverse of the optimized prototype pulse signal, a logical zero is generated at the output of comparator 712. There is no intersymbol distortion in this decision process, except that which is unavoidable due to the IF filtering and that caused by multipath signal reception.

Figure 8:
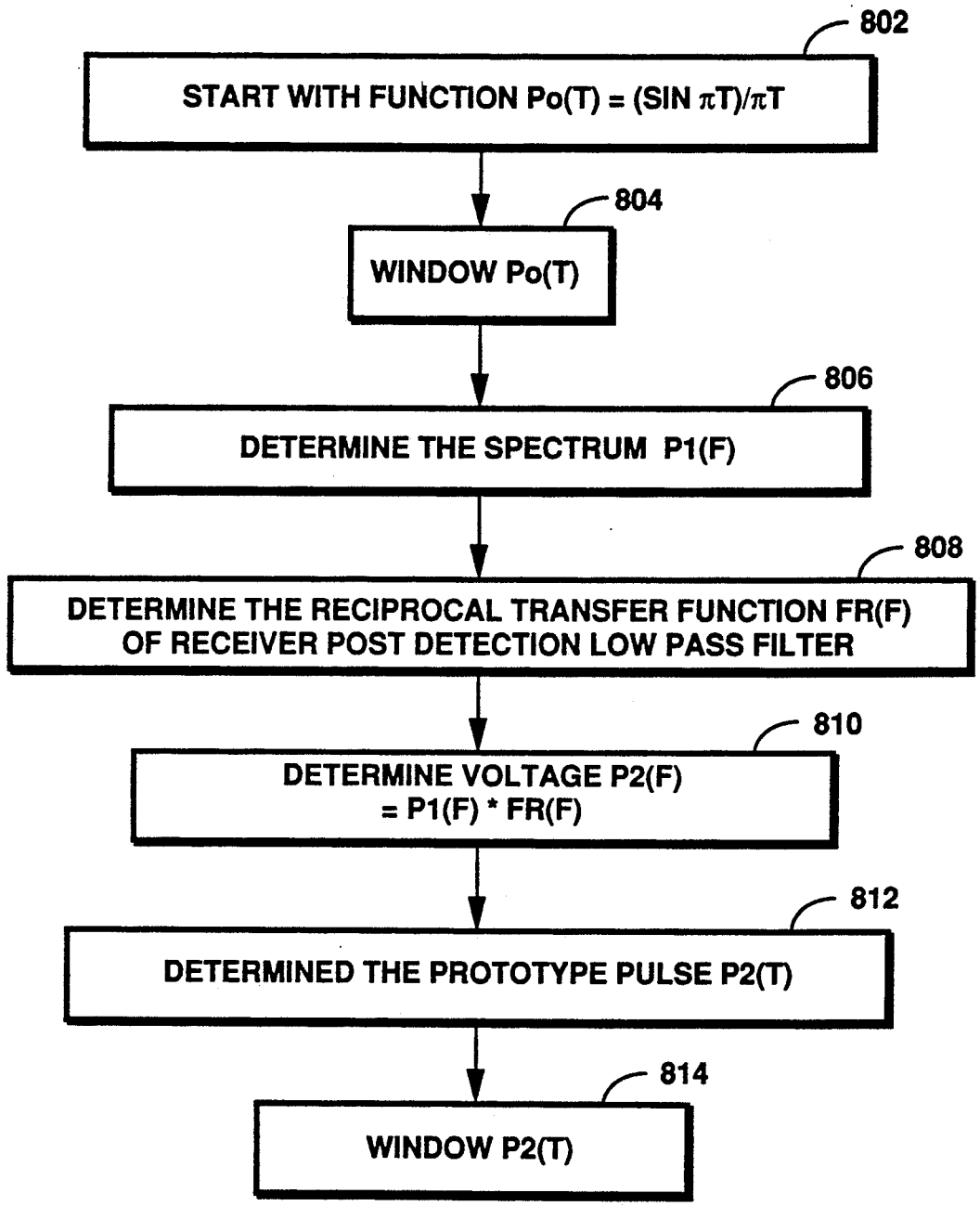
FIG. 8 is a flowchart of the method of the invention.

The method of generating an optimized prototype pulse is summarized in the flowchart of FIG. 8. The method starts with a function $P_0(t) = (\sin \pi t)/\pi t$ at block 802. The selected function is windowed at block 804, by a predetermined window function to obtain a pulse $P_1(t)$ having minimum energy outside the window. The spectrum $P_1(f)$ of the pulse $P_1(t)$ derived at step 804, is determined by taking the Fourier transform at step 806. The reciprocal transfer function FR(f) of the receiver post detection low pass filter is determined at step 808. The reciprocal transfer function FR(f) is multiplied by the spectrum $P_1(f)$ to determine the spectrum $P_2(f)$ at block 810. The desired prototype pulse is determined, at step 812, by taking the inverse Fourier transform of the spectrum $P_2(f)$. The optimized prototype pulse is finally determined by windowing the desired prototype pulse with a second predetermined window function, at step 814. Data defining the optimized prototype pulse is stored in a ROM, to be used in the transmission of binary information. When transmitted, the optimized prototype pulse minimizes splatter and adjacent channel interference. The transmitted optimized prototype pulses can be recovered by a conventional FM receiver, with no generation of intersymbol interference in the process.

While a specific embodiment of this invention has been shown and described, further modifications and improvements will occur to those skilled in the art. All modifications which retain the basic underlying principles disclosed and claimed herein are within the scope and spirit of the present invention.

I claim:

1. A method for generating an optimized electric pulse suitable for the transmission of information to a frequency modulated (FM) receiver for minimizing intersymbol interference, said method comprising the steps of:
   selecting a first pulse $P_o(t) = (\sin \pi t)/\pi t$ which exhibits the property of low intersymbol interference;
   multiplying the first pulse $P_o(t)$ with a first predetermined window function $K(t)$ to obtained a second pulse $P_1(t)$ minimizing the energy density outside the window;
   determining the spectrum $P_1(f)$ by taking the Fourier transform of the second pulse $P_1(t)$;
   determining a filter function $FR(f)$ which is the reciprocal of the transfer function of the receiver post detection low pass filter;
   multiplying the spectrum $P_1(f)$ with the reciprocal filter function $FR(f)$ to obtain a spectrum $P_2(f)$;
   determining a third pulse $P_2(t)$ by taking the inverse Fourier transform of the spectrum $P_2(f)$; and
   multiplying the third pulse $P_2(t)$ by a second predetermined window function $W(t)$ to obtain the optimized electric pulse $P_3(t)$.

2. The method for generating an optimized electric pulse, according to claim 1 wherein the first predetermined window function is a Kaiser window function.

3. The method for generating an optimized electric pulse, according to claim 1 wherein the second predetermined window function is a unity window function having cosine squared shaping.

4. A method for transmitting digital information to a communication receiver employing a post detection low pass filter having predetermined filter transfer function, said method comprising the steps of:
   storing an optimized electric pulse which is derived from the processing of an electric pulse exhibiting minimum intersymbol interference characteristics with the reciprocal transfer function of the post detection low pass filter of the communication receiver, the optimized electric pulse when received and processed by the post detection low pass filter of the communication receiver providing a pulse shape exhibiting minimal intersymbol interference;
   recovering the stored, optimized electric pulse in response to the digital information to be transmitted, for generating a sequence of the optimized prototype pulses corresponding thereto; and
   transmitting the sequence or optimized electric pulses.

5. The method according to claim 4, wherein said step of storing comprises the step of storing a sequence of numerical values depicting the optimized electric pulse.

6. The method according to claim 4, wherein the digital information is represented by at least two transmitted symbols, and wherein said step of generating comprises the steps of:
   selecting the sequence of numerical values depicting the optimized electric pulse corresponding to the first transmitted symbol; and
   selecting the inverse of the sequence of numerical values depicting the optimized electric pulse corresponding to the second transmitted symbol.

7. The method according to claim 6, wherein said step of generating further comprises the steps of:
   converting the sequences of numerical values depicting the optimized electric pulses and the inverses into an analog sequence of optimized electric pulses and the inverses corresponding to the digital information to be transmitted; and
   filtering the analog sequence of optimized electric pulses and the inverses.

8. The method according to claim 6, wherein said step of transmitting further comprises the step of transmitting the filtered analog sequence of optimized electric pulses and the inverses.

* * * * *